United States Patent
Yamada et al.

(10) Patent No.: US 6,815,662 B2
(45) Date of Patent: Nov. 9, 2004

(54) APPARATUS AND METHOD FOR MEASURING OPTICAL SIGNALS BY OPTICAL SAMPLING

(75) Inventors: Norihide Yamada, Kokubunji (JP); Katsuya Yamashita, Kanagawa (JP); Satoshi Watanabe, Yokohama (JP)

(73) Assignee: Agilent Technologies, Inc., Palo Alto, CA (US)

( * ) Notice: Subject to any disclaimer, the term of this patent is extended or adjusted under 35 U.S.C. 154(b) by 301 days.

(21) Appl. No.: 10/144,208

(22) Filed: May 10, 2002

(65) Prior Publication Data

US 2002/0175275 A1 Nov. 28, 2002

(30) Foreign Application Priority Data

May 10, 2001 (JP) ........................................ 2001-140022

(51) Int. Cl.[7] ............................ G01N 21/25; G01B 9/10
(52) U.S. Cl. ............................ 250/227.27; 250/227.23; 385/32
(58) Field of Search ................ 250/227.23, 227.27; 356/73.1; 385/30–32, 39, 42, 48, 88, 92

(56) References Cited

U.S. PATENT DOCUMENTS

| | | | |
|---|---|---|---|
| 5,687,261 A | * | 11/1997 | Logan ........................ 385/24 |
| 5,799,116 A | | 8/1998 | Yamamoto |
| 5,815,309 A | | 9/1998 | Lawrence et al. |
| 6,052,220 A | | 4/2000 | Lawrence et al. |
| 6,389,195 B1 | * | 5/2002 | Havstad et al. ............... 385/27 |

FOREIGN PATENT DOCUMENTS

| | | |
|---|---|---|
| EP | 0903567 A2 | 3/1999 |
| JP | 09159536 | 6/1997 |
| JP | 10-221174 | 8/1998 |
| JP | 11298073 | 10/1999 |
| JP | 2000249604 | 9/2000 |

OTHER PUBLICATIONS

Takara, H. et al., "Optical Signal Eye Diagram Measurement with Subpicosecond Resolution Using Optical Sampling", Electronics Letters, Jul. 18, 1996, vol. 32, No. 15, pp. 1399–1400.

* cited by examiner

*Primary Examiner*—Stephone B. Allen
*Assistant Examiner*—Patrick J. Lee

(57) ABSTRACT

A measurement apparatus for an optical signal under test includes a closed-loop optical path, an optical mixer in the closed-loop optical path and a photodetector. The optical signal under test and sampling light having a wavelength different from that of the optical signal under test are circulated in the closed-loop optical path. Sum/difference frequency light is generated every time the sampling light passes through the optical mixer. The sum/difference frequency light is detected by the photodetector, which provides a signal representative of the waveform of the optical signal under test.

28 Claims, 2 Drawing Sheets

APPARATUS AND METHOD FOR MEASURING OPTICAL SIGNALS BY OPTICAL SAMPLING

BACKGROUND

1. Technological Field

The present invention relates generally to the measurement of optical signals, and more specifically to a measurement apparatus and method for measuring a high-frequency optical signal under test.

2. Background Art

In recent years, optical technology has come to be used in many different fields, including measurement, communications, recording, machining, etc. In many of these fields, higher speeds have become more and more important, and high-speed optical technology has become particularly important in the field of telecommunications. The information signals with which optical signals used in these fields are modulated have reached double-digit gigabytes per second (Gbps) levels and will increase in speed in the future.

Thus, there is a growing need to provide an apparatus and method for measuring optical signals. Optical sampling is particularly suited to measurement of high-frequency optical signals, which are optical carrier signals modulated with information signals having frequencies in a wide range from several gigahertz (GHz) to several dozen terahertz (THz). Moreover, such optical sampling measurement apparatus is required to be capable of accommodating optical signals whose carrier frequencies are substantially higher than that of the modulation frequencies.

Further, for a high-frequency optical signal measurement apparatus to be practical, the apparatus requires extra capabilities, such as being able to deal flexibly, easily, and quickly with new measurement requirements while having the ability to deal with high modulation frequencies.

A search for such apparatus and methods has been long ongoing, but has long eluded those skilled in the art.

SUMMARY OF THE INVENTION

The present invention provides a measurement apparatus and method for an optical signal under test. The apparatus includes a closed-loop optical path, an optical mixer in the closed-loop optical path and a photodetector. The optical signal under test and sampling light having a wavelength different from that of the optical signal under test are circulated in the closed-loop optical path. Sum/difference frequency light is generated every time the sampling light passes through the optical mixer. The sum/difference frequency light is detected by the photodetector, which provides a signal representative of the waveform of the optical signal under test.

In the method, the optical signal under test and sampling light having a wavelength different from that of the optical signal under test are circulated at different speeds. Sum/difference frequency light is generated for each circulation of the optical signal under test and the sampling light. The sum/difference frequency light is detected and a detector signal representative of the waveform of the optical signal under test is provided.

The apparatus and method are capable of optically sampling optical signals under test modulated with information signals having frequencies in a wide range from several gigahertz (GHz) to several dozen terahertz (THz).

The above and additional advantages of the present invention will become apparent to those skilled in the art from a reading of the following detailed description when taken in conjunction with the accompanying drawing.

DETAILED DESCRIPTION OF THE INVENTION

Figure 1:
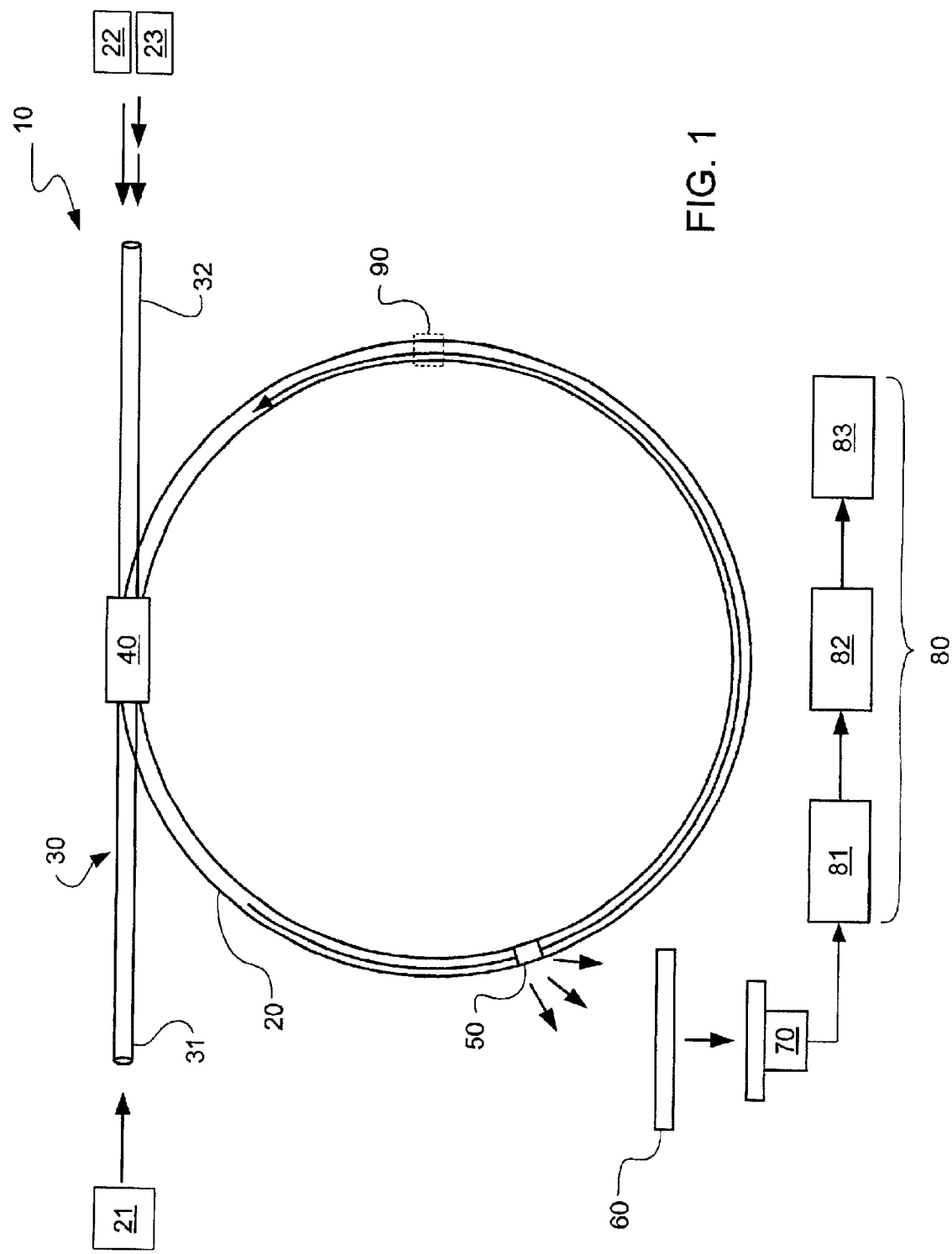
FIG. 1 is a simplified diagram of a high-frequency optical signal measurement apparatus in accordance with the present invention.

Referring now to FIG. 1, therein is shown optical signal measurement apparatus 10 in accordance with the present invention. The apparatus 10 includes a closed-loop optical path 20, an input optical path 30, and a connector 40, which optically connects the input optical path 30 to the closed-loop optical path 20. The optical signal under test and sampling light circulate though the closed-loop optical path 20. An optical mixer 50 is provided in part of the closed-loop optical path 20. The optical mixer 50 generates light at frequencies corresponding to the sum and the difference of the frequencies of the optical signal under test and the sampling light. Such light will be called "sum/difference frequency light". The sum/difference frequency light is optionally filtered by an optical filter 60 and then is detected by a photodetector 70. The photodetector generates a waveform representative of the waveform of the optical signal under test. The electrical output of the photodetector 70 is processed by a processing system 80 to reconstruct the original waveform of the optical signal under test thereby measuring the optical signal under test by optical sampling.

The closed-loop optical path 20 can be an optical fiber, an optical waveguide or a free space transmission path.

By way of example, the closed-loop optical path 20 can contain an optical fiber whose refractive index is about 1.5. All or a part of the optical fiber can be doped with a rare earth. An example of such a rare earth is the element erbium (Er), which can be excited by pumping light to fluoresce at specific frequencies and amplify light passing through the doped portion. The amount of doping and the intensity of the pumping light are adjusted ahead of time so that the gain will be roughly equal to the attenuation of the closed-loop optical path 20 absent such gain. For instance, if a 3 dB fixed coupler is used as the connector 40, the closed-loop gain is set at approximately 3 dB. Because of the gain of the closed-loop optical path 20, the optical signal under test and the sampling light continue circulating through the closed-loop optical path without attenuation or gain.

The length of the closed-loop optical path 20 is determined by taking into account the temporal duration $T_{signal}$ of the optical signal under test, and the desired sampling repetition period $T_{repetition}$. Specifically, l is determined to satisfy the following formulas (1) and (2).

$$n \cdot l > c \cdot T_{signal} \quad (1)$$

$$n \cdot l < c \cdot T_{repetition} \quad (2)$$

For instance, if $T_{signal}$ is 1 ns, then l>0.2 m, and if $T_{repetition}$ is 100 ns, then l<20 m, so a length of 10 m can be selected from this range.

The input optical path 30 has first and second portions 31 and 32. A pumping light source 21 inputs pumping light into the first portion 31. The optical signal under test having a wavelength corresponding to a frequency $f_1$ of 190 THz, for example, and sampling light having a different wavelength, corresponding to a frequency $f_2$ of 180 THz, for example, are input into the second portion 32. The sampling light generator 22 generates the sampling light, which can be a mode locked fiber laser that generates short, high frequency optical pulses. The optical signal source 23 provides the optical signal under test. The pumping laser 21 and the sampling light generator 22 can be part of the closed-loop optical path 20 or can be separate as shown.

The connector 40 introduces the pumping light, the optical signal under test, and the sampling light into the closed-loop optical path 20. The connector 40 is an optical connector, such an optical coupler or an optical switch. In the embodiment shown, the optical signal under test and the sampling light circulate the closed-loop optical path in one direction and the pumping light circulates in the opposite direction.

The optical mixer 50 is well known in the art and describes a device, which generates light at frequencies corresponding to the sum ($f_1+f_2$) and the difference ($f_1-f_2$) of the frequencies of light passing through it. Thus, the optical mixer 50 generates the sum/difference frequency light when the optical signal under test and the sampling light pass through it.

By way of example, the optical mixer 50 can be a portion of the closed-loop optical path 20 having optical nonlinearity, or can include a crystal having optical nonlinearity, and provided separately from the optical path that makes up the closed-loop optical path 20. For example, the crystal may be located in a break in the closed-loop optical path. The crystal having optical nonlinearity generates the sum/difference frequency light in response to the optical signal under test and the sampling light.

The length $l_{opt\,mix}$ of the optical mixer 50 is less than the maximum length at which adequate time resolution is obtained by applying the following formula (3) to the maximum frequency $F_{signal}$ (such as 1 THz) of the optical signal under test.

$$\frac{n \cdot l_{opt\,mix}}{c} \approx \frac{1}{3F_{signal}} \quad (3)$$

where n is the refractive index of the material of the optical mixer 50. A typical value for the length $l_{opt\,mix}$ of the optical mixer is about 0.07 mm.

Since the optical signal under test and the sampling light both circulate through the closed-loop optical path 20 the second harmonic of the optical signal under test (having a frequency of $2\times f_1$ and an intensity proportional to the square of the intensity of the optical signal under test) and the second harmonic of the sampling light (having a frequency of $2\times f_2$, and an intensity proportional to the intensity of the optical signal under test×the intensity of the sampling light) are generated by the optical mixer due to the optical nonlinearity thereof on every circuit of the closed-loop optical path 20. In addition, frequency components at sum and difference frequencies and second harmonic light related to the pumping light are also generated on every circuit of the closed-loop optical path 20. The frequency components at the sum and difference frequencies relating to the pumping light and second harmonic frequencies are generally weak enough that they can be ignored. However, when they cannot be ignored, the optional optical filter 60 is provided to transmit only the sum/difference frequency light generated in response to the optical signal under test and the sampling light.

Setting the sampling light to an appropriate intensity ahead of time allows the intensity of the optical signal under test to be ascertained, that is, allows sampling to be performed. It should be noted that $F_{signal}$ is slightly less than $f_1$.

The closed-loop optical path 20 is dispersive. For example, refractive index of the optical fiber constituting the closed-loop optical path is wavelength dependent. As a result, the speeds at which the optical signal under test and the sampling light circulate through the closed-loop optical path differ. The optical mixer 50 generates the sum/difference frequency light only when the sampling light passes through it. Because of the speed differential, the position of the sampling light relative to optical signal under test passing through the optical mixer 50 differs each round trip. The wavelength dependence Δn of the refractive index and the length l of the closed-loop optical path are preset (e.g., lΔn about 0.1 mm) so that the change Δt in the position of the sampling light relative to the optical signal under test on each round trip will be small enough that adequate sampling resolution will be obtained ($<\frac{1}{2} F_{signal}$, e.g., <0.5 ps).

$$\Delta t = \frac{n_{signal}\,l}{c} - \frac{n_{sampling}\,l}{c} = \frac{l\Delta n}{c} < \frac{1}{2F_{signal}} \quad (4)$$

Every time the sampling light makes a trip round the closed-loop optical path 20, the photodetector 70 detects the intensity of the sum/difference frequency light generated by the optical mixer 50 and outputs an analog electrical signal to the processing system 80. The analog signal is representative of a sample of the waveform of the optical signal under test.

The example of the processing system 80 shown includes an A/D converter 81, digital memory 82, and waveform reproduction circuitry 83. The analog electrical signal from the photodetector 70 is converted to a digital signal by the A/D converter 81 and the digital signal is stored in the digital memory 82. The digital signals representing the samples of the waveform of the optical signal under test can be recalled from the digital memory 82 and the waveform can be reproduced by a splicing method, such as by parallelizing the data using the waveform reproduction circuitry 83.

The apparatus 10 and the method to be described below make it possible to optically sample and measure high-frequency optical signals having modulation frequencies that range from a few GHz to several dozen THz as $F_{signal}$. Specifically, the measurement apparatus and measurement method make it possible to measure high-frequency optical signals over a wider range of modulation frequencies, and are thus extremely effective for practical purposes, in comparison with prior art apparatus and methods.

In a first alternative embodiment, the optical signal under test and the sampling light are input into different ones of the input portions 31 and 32 of the input optical path 30. In this case, the optical signal under test and the sampling light introduced through the connector 40 to the closed-loop optical path 20 will circulate in opposite directions. Again, the timing at which the optical signal under test and the sampling light meet at the optical mixer 50 is different each round trip. However, the timing difference is the same as when they are moving in the same direction, so the same measurement results can be obtained.

Also, only one input optical path 30 was used in the above embodiment for inputting the optical signal under test, the sampling light and the pumping light. However, the number of input optical paths does not necessarily have to be one. For instance, two or more input optical paths cans be used so that one or more of the optical signal under test, the sampling light and the pumping light, are input via optical paths separate from the other optical paths, or all of the input optical paths used for introducing light may be separate.

In a second alternative embodiment, the arrangement for inputting r the pumping light is changed. Since the pumping light imparts gain to the closed-loop optical path 20, it may be input into either the first or second portions 31 and 32 of the input optical path, or it may be input into another portion of the input optical path or into an additional input optical path, as mentioned above.

In a third alternative embodiment, if the attenuation in the closed-loop optical path 20 is sufficiently small during the overall measurement time, then an adequate sampling measurement can be performed even when there is no gain in the closed-loop optical path. In this case, the pumping light source 21 may be omitted, and the doping or doped region can be omitted from the closed-loop optical path. Usually, though, the loss in the connector 40 is too large to ignore, so the pumping light source 21 and doping can only be omitted when an element with little loss, such as an optical switch, is used as the connector for connecting the closed-loop optical path 20 with the input optical path 30.

In a fourth alternative embodiment, the pulses of sampling light are generated by laser oscillation in the closed-loop optical path 20. Since at least part of the closed-loop optical path 20 has gain, laser oscillation can be produced and a mode locked laser provided within the closed-loop optical path 20 by increasing the gain of the closed-loop optical path. In this embodiment, circulating pulses of sampling light can be provided without introducing the sampling light from the outside. The period of the pulses of sampling light will be equal to the time it takes for the pulses to make one round trip.

In a fifth alternative embodiment, an adjustment mechanism 90 is provided for adjusting the timing at which the sum/difference frequency light is generated. This adjustment mechanism comprises, for example, a mechanical mechanism for extending or shortening the closed-loop optical path by subjecting the closed-loop optical path to an external force. Alternatively, the adjustment mechanism may be an optical element that constitutes part of the closed-loop optical path, and whose optical path length can be adjusted. Based on the present disclosure, the structure of the adjustment mechanism 90 and similar mechanisms would be evident to those having ordinary skill in the art.

Figure 2:
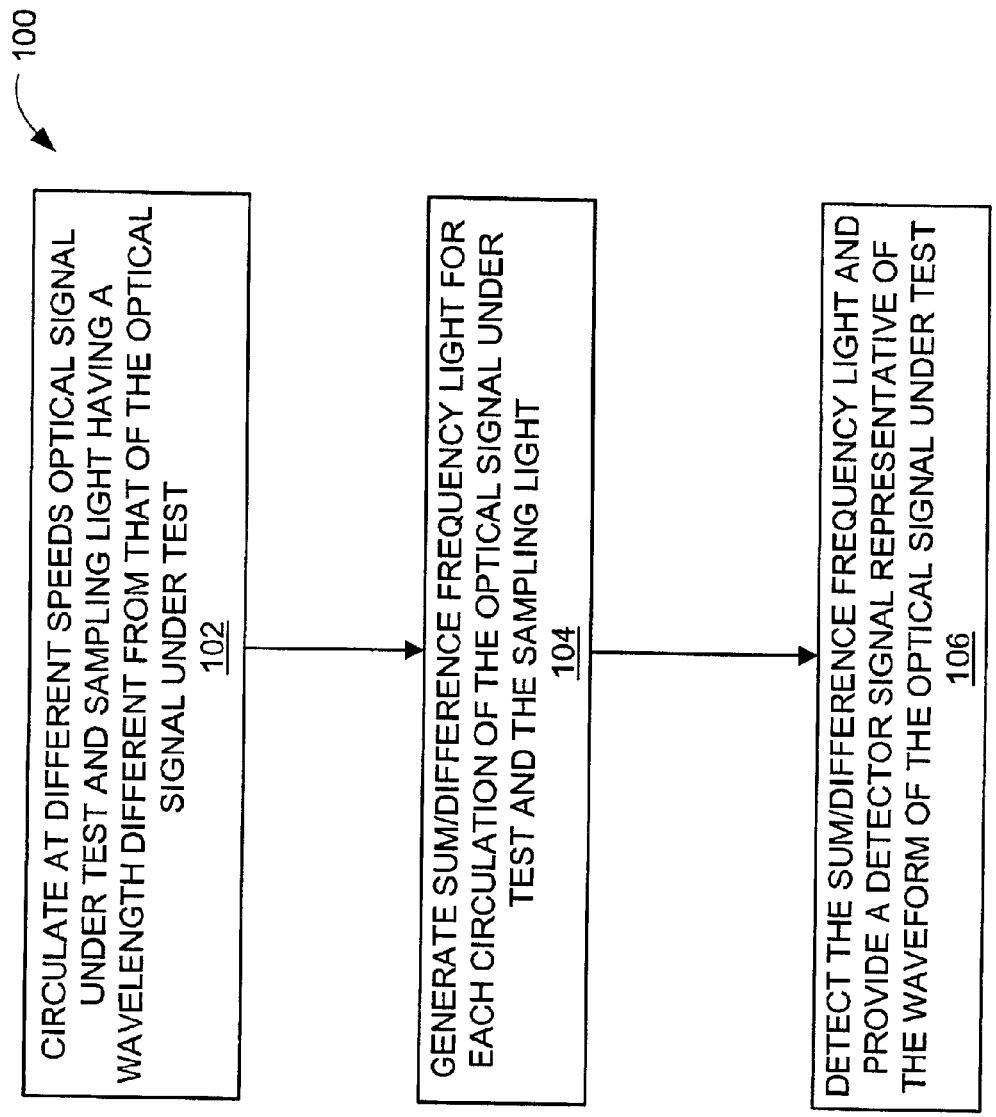
FIG. 2 is a simplified flow chart of the method in accordance with the present invention.

Referring now to FIG. 2, therein is shown a simplified flow chart of the method 100 in accordance with the present invention. In the method 100, in process 102, the optical signal under test and sampling light are circulated at different speeds. The sampling light has a wavelength different from that of the optical signal under test.

In process 104, sum/difference frequency light is generated for each circulation of the optical signal under test and the sampling light.

In process 106, the sum/difference frequency light is detected and a detection signal representative of the waveform of the optical signal under test is provided.

In process 104, subjecting the optical signal under test and the sampling light to an optical non-linearity may generate the sum/difference frequency light.

The method may additionally include a process in which the detector signal is processed to reconstruct the waveform of the optical signal under test.

The method may additionally include a process in which the sum/difference frequency light is frequency-selectively transmitted between the generating and the detecting of the sum/difference frequency light.

The method may additionally include a process in which the optical signal under test and the sampling light are input to circulate in directions selected from the same and opposite directions.

In process 102, the optical signal under test and the sampling light may additionally be amplified as they circulate. While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus for measuring an optical signal under test by optical sampling, comprising:

a closed-loop optical path for circulation of the optical signal under test and sampling light having a wavelength different from that of the optical signal under test; and an optical mixer in the closed-loop optical path for generating sum/difference frequency light each time the optical signal under test and the sampling light pass therethrough; and a detector for detecting sum/difference frequency light generated by the optical mixer and providing a detector signal representative of the waveform of the optical signal under test.

2. The apparatus as claimed in claim 1, additionally comprising a processing system for processing the detector signal to reconstruct the waveform of the optical signal under test.

3. The apparatus as claimed in claim 1, additionally comprising a filter for selectively transmitting the sum/difference frequency light from the optical mixer to the detector.

4. The apparatus as claimed in claim 1, additionally comprising an input optical path that is optically coupled to the closed-loop optical path for inputting the optical signal under test and the sampling light to circulate in directions selected from the same and opposite directions.

5. The apparatus as claimed in claim 1, wherein the closed-loop optical path includes an optical fiber having an optical gain for amplifying the optical signal under test and the sampling light.

6. The apparatus as claimed in claim 1, wherein the closed-loop optical path includes an adjustment mechanism for adjusting timing at which the sum/difference frequency light is generated.

7. The apparatus as claimed in claim 1, additionally comprising a source of the sampling light operatively connected to the closed-loop optical path.

8. An apparatus for measuring an optical signal under test by optical sampling, comprising:

a closed-loop optical path for circulation of the optical signal under test and sampling light having a wavelength different from that of the optical signal under test, the closed-loop optical path selected from a group consisting of an optical fiber, an optical waveguide, a free space transmission path, and a combination thereof; and an optical mixer in a part of the closed-loop optical path having an optical nonlinearity for generating sum/difference frequency light each time the optical signal under test and the sampling light pass through the optical mixer; and a photodetector for detecting the sum/difference frequency light generated by the optical mixer and providing a photodetector signal representative of the waveform of the optical signal under test.

9. The apparatus as claimed in claim 8, additionally comprising a processing system for processing the photodetector signal to reconstruct the waveform of the optical signal under test, the processing system comprising components selected from a group consisting of an analog-to-digital converter, a digital memory, waveform reproduction circuitry, and a combination thereof.

10. The apparatus as claimed in claim 8, additionally comprising a filter for selectively transmitting only the sum/difference frequency light from the optical mixer to the photodetector.

11. The apparatus as claimed in claim 8, additionally comprising an input optical path that is optically coupled to the closed-loop optical path for inputting the optical signal under test, the sampling light, and a pumping light to circulate in directions selected from the same direction, opposite directions, and a combination thereof.

12. The apparatus as claimed in claim 8, wherein the closed-loop optical path includes an optical fiber having optical gain for amplifying the optical signal under test and the sampling light using pumping light whereby the optical gain will be about equal to the light loss in the closed-loop optical path.

13. The apparatus as claimed in claim 8, wherein the closed-loop optical path includes an adjustment mechanism for adjusting the length thereof.

14. The apparatus as claimed in claim 8, additionally comprising a source of sampling light, and a source of pumping light operatively connected to the closed-loop optical path.

15. A method for measuring an optical signal under test by optical sampling, comprising:

circulating at different speeds the optical signal under test and sampling light having a wavelength different from that of the optical signal under test;

generating sum/difference frequency light for each circulation of the optical signal under test and the sampling light; and detecting the sum/difference frequency light and providing a detector signal representative of the waveform of the optical signal under test.

16. The method as claimed in claim 15, additionally comprising processing the detector signal to reconstruct the waveform of the optical signal under test.

17. The method as claimed in claim 15, additionally comprising frequency-selectively transmitting the sum/difference frequency light between the generating and the detecting of the sum/difference frequency light.

18. The method as claimed in claim 15, additionally comprising inputting the optical signal under test and the sampling light to circulate in directions selected from the same and opposite directions.

19. The method as claimed in claim 15, wherein circulating the optical signal under test and the sampling light includes amplifying the optical signal under test and the sampling light.

20. The method as claimed in claim 15, wherein circulating the optical signal under test and the sampling light includes adjusting timing at which the sum/difference frequency light is generated.

21. The method as claimed in claim 15, additionally comprising providing the sampling light.

22. The method as claimed in claim 15, wherein generating the generating sum/difference frequency light includes subjecting the optical signal under test and the sampling light to an optical nonlinearity.

23. The method as claimed in claim 22, additionally comprising processing the photodetector signal to reconstruct a waveform of the optical signal under test comprising selecting processing from a group consisting of:

converting the photodetector signal from an analog signal to a digital signal, storing the digital signal, reproducing the waveform of the optical signal under test from the digital signal, and a combination of the converting, the storing, and the reproducing.

24. The method as claimed in claim 22, additionally comprising frequency-selectively transmitting the sum/difference frequency light between the generating and the detecting of the sum/difference frequency light.

25. The method as claimed in claim 22, additionally comprising inputting the optical signal under test, the sampling light, and pumping light to circulate in directions selected from the same direction, opposite directions, and a combination thereof.

26. The method as claimed in claim 22, wherein circulating the optical signal under test and the sampling light includes amplifying the optical signal under test and the sampling light using pumping light whereby the amplification will be about equal to the light loss in each circulation.

27. The method as claimed in claim 22, wherein circulating the optical signal under test and the sampling light includes adjusting the timing of the generating of the sum/difference frequency light.

28. The method as claimed in claim 22, additionally comprising providing the sampling light and pumping light.

* * * * *